United States Patent
Bönisch et al.

[15] 3,638,899
[45] Feb. 1, 1972

[54] OUTSIDE MIRROR FOR MOTOR VEHICLES

[72] Inventors: Herbert Bönisch, Darmsheim; Heinz Gaiser; Guntram Huber; Erwin Kölle, all of Sindelfingen, all of Germany

[73] Assignee: Daimler-Benz Aktiengesellschaft, Stuttgart-Unterturkheim, Germany

[22] Filed: Aug. 9, 1968

[21] Appl. No.: 751,519

[30] Foreign Application Priority Data

Aug. 11, 1967 Germany...................P 16 30 338.1

[52] U.S. Cl..............................248/483, 248/475 B, 248/288
[51] Int. Cl..............................................................B60r 1/06
[58] Field of Search.........................248/475, 476, 481–484, 248/288, 226; 350/288, 307; 74/491, 501 M

[56] References Cited

UNITED STATES PATENTS 2,845,000   7/1958   Morley...................................248/481

FOREIGN PATENTS OR APPLICATIONS

| 1,743,507 | 4/1957 | Germany...................248/479 |
| 1,236,575 | 6/1960 | France.....................248/475 B |
| 848,705 | 9/1960 | Great Britain.............248/475 B |
| 970,260 | 9/1964 | Great Britain.............248/475 B |

*Primary Examiner*—William H. Schultz
*Attorney*—Craig, Antonelli & Hill

[57] ABSTRACT

An outside mirror for motor vehicles which includes a base portion adapted to be secured at the vehicle body, in particular, to the outer wall of a front door, and a head portion that carries the mirror glass; the head portion is adjustably retained at the base portion at a place which is located on the side of the vehicle in relation to its vertical center axis, and is rotatable with respect to the base portion about an essentially vertical axis while a resistance opposes the relative rotary movement about this axis which is larger than the aerodynamic forces that occur normally.

5 Claims, 3 Drawing Figures

PATENTED FEB 1 1972

3,638,899

INVENTORS
HERBERT BOENISCH
HEINZ GAISER
GUNTRAM HUBER
ERWIN KOELLE

BY *Craig & Antonelli*

ATTORNEYS 3,638,899

OUTSIDE MIRROR FOR MOTOR VEHICLES

BACKGROUND OF THE INVENTION

The present invention relates to an outside or side mirror for motor vehicles with a base portion adapted to be secured at the body, especially at the outer panel of a front door, and with a head portion carrying the mirror glass which is adjustably retained on the base portion at a place located on the side of the vehicle in relation to its vertical center axis.

With the most commonly used outside mirrors, the head portion is retained at the base portion by means of a joint disposed within the area of the center cross axis of the mirror glass in front of this glass as viewed in the driving direction. This entails the danger in particular with an arrangement of the mirror at the outer wall of a vehicle front door that it may lead to collisions at the mirror which projects laterally beyond the vehicle contour. In this case of such a collision with traffic participants or pedestrians, serious injuries may be caused. Safety mirrors have already become known in the prior art for avoiding this shortcoming whose base portion at the vehicle body can be pivoted or deflected in an elastically yielding manner from its normal position. The head portion is thereby retained at the base portion by means of a place located on the side of the vehicle with respect to its vertical center axis. Even though such safety mirrors are suitable for the mounting on an engine hood in front of the passenger space of a vehicle, because a sufficient space is available thereat for the pivoting of the rearview mirror together with the base portion thereof, it is nevertheless disadvantageous in connection therewith that such safety mirrors are suited only poorly for a mounting at a vehicle door. This is so because as a result of an unpredicted collision, the head portion of the mirror can be thrown so vehemently against parts of the body and especially against the glass pane of the door that a damage at the body or even a breaking of the pane takes place.

SUMMARY OF THE INVENTION

The present invention aims at avoiding the aforementioned shortcomings and at creating an outside mirror, suitable in particular for the mounting at the outside wall of a vehicle door, which, in case of collisions, is able to deflect from its normal operating position without danger of damages at the motor vehicle.

The underlying problems are solved according to the present invention essentially in that the head portion of the aforementioned outside mirror is rotatable with respect to the base portion about an essentially vertical axis and a resistance which is larger than the aerodynamic forces, counteracts or opposes a rotary movement about this axis.

With such a mounting of the head portion at the base portion of the outside mirror, the head portion, in case of a collision, which unintentionally can occur as a rule only in or opposite the driving direction, is able to pivot simply about the vertical axis of rotation of its mounting means until, for example, it is disposed with its mirror glass surface parallel to the sidewall of the vehicle. A damaging of parts of the vehicle by the pivoted head portion of the mirror need not be feared thereby because the resistance, which is necessary anyhow with respect to a rotation of the head portion, prevents a possibly automatic further pivoting movement up to a position in which the outer area of the head portion, in its operating position, could hit parts of the body.

According to a preferred constructive embodiment of the present invention, the head portion is connected with the base portion by way of a screw forming the axis of rotation, against whose screw head the head portion is supported by means of its approximately spherically shaped bearing body, through which extends the screw, and by way of a coil spring surrounding the screw. Such a simple rotatable bearing support permits at the same time to adjust the prestress of the coil spring by a simple, corresponding screwing-in of the screw into a threaded bore of the base portion receiving the same.

Accordingly, it is an object of the present invention to provide an outside mirror for motor vehicles which avoids by simple means the aforementioned shortcomings and drawbacks encountered in the prior art.

Another object of the present invention resides in outside mirrors for motor vehicles, especially in rearview side mirrors adapted to be mounted at the outer wall of the vehicle front door, which minimize the danger of damage to body and/or injury to the passenger in case of collision by that part of the mirror which projects beyond the vehicle body contour in the normal operating position.

A further object of the present invention resides in an outside mirror which not only achieves all of the aforementioned aims and objects by simple means but which also offers a simple adjustment of the device.

These and further objects, features and advantages of the present invention will become more obvious from the following description when taken in connection with the accompanying drawing which shows, for purposes of illustration only, one embodiment in accordance with the present invention and wherein.

Figure 2:
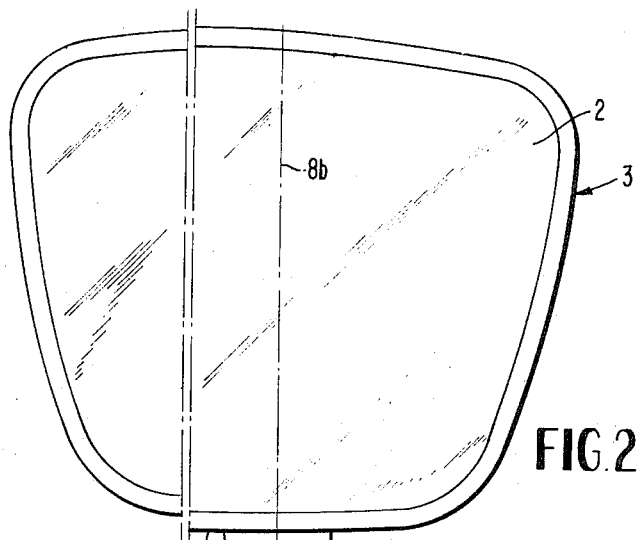
FIG. 2 is a plan view on the mirror glass of the mirror of FIG. 1.

Referring now to the drawing wherein like reference numerals are used throughout the various views to designate like parts, the outside mirror illustrated in the drawing essentially consists of a base portion generally designated by reference numeral 1 and of a head portion generally designated by reference numeral 3 which carries the mirror glass 2 in a conventional manner. The base portion 1 which is constructed as short as possible, may be conventionally secured to the outer wall or panel 6 of a motor vehicle door 7 or to any other body part of a motor vehicle by way of screws 4 and by the interposition of a rubber plate 5.

The head portion 3 is secured to the base portion 1 by means of a screw 8 whose axis extends essentially vertically. The screw 8 extends through the approximately spherically shaped bearing body 9 of the head portions 3 in an opening 10 exceeding the screw diameter in order that the head portion 3 can be so adjusted in a conventional manner within a ball socket 11 of the base portion 1 accommodating the bearing body 9 that the driver of the vehicle is able to see the rear driving conditions by way of the mirror.

Figure 1:
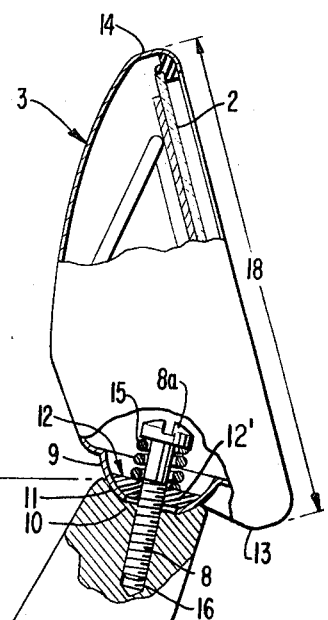
FIG. 1 is a side elevational view of an outside mirror in accordance with the present invention, with parts of the mirror head portion shown in cross section for the sake of improved clarity.
Figure 3:
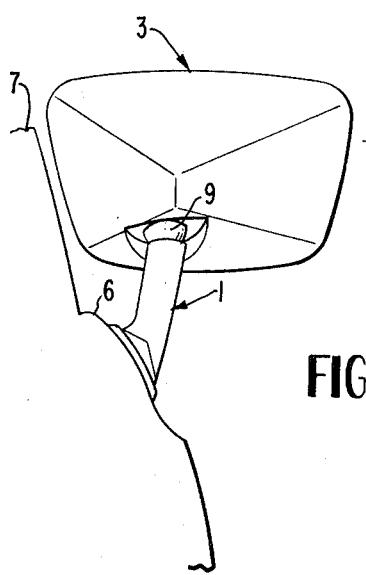
FIG. 3 is a rear elevational view of the mirror of FIGS. 1 and 2, mounted at a vehicle door.

As can be further seen from FIG. 1, the separating surface generally designated by reference numeral 12 between the head portion 3 and the base portion 1 which is formed by the top surface of a bearing member 12' of partial spherical shape complementary to the internal surface of the bearing body 9 and provided with an unthreaded bore receiving the screw 8, is located above the lower boundary edge 13 of the mirror shell 14 of the head portion 3 whence in case of collisions, a tilting of the head portion 3 is precluded downwardly to the rear in the driving direction. The head portion 3 is supported at the head 8a of the screw 8 by way of a coil spring 15 surrounding the screw 8 whose prestress can be adjusted by a corresponding further screwing-in of the screws 8 into an associated threaded bore 16 of the base portion 1. As to the rest, the base portion 1 has a height 17 which is smaller than the height 18 of the head portion 3.

If the motor vehicle provided with the described outside mirror should hit or impinge, for example, during the drive with the area of the head portion 3 of its outside mirror, which projects laterally beyond the outside contour of its body, against any fixed object along the edge of the street, then this has as a consequence merely a pivoting of the head portion 3 about the axis 8b (FIG. 2) of the screw 8, which is possible without difficulty to such an extent that the head portion 3 pivoted through 90° is still disposed within the contour determined by the overall width of the vehicle. By reason of the fact that the base portion 1 is very short and is directed upwardly at a steep inclination, one obtains at the same time for the head portion 3, which is retained at the base portion 1 at a place located on the side of the vehicle in relation to its vertical center axis, an easy rotatability with respect to the resistance of the coil spring 15 if the rotary force, as may be presupposed in case of collisions, engages at the outer edge area of the head portion 3. In case of mounting of the described mirror on a motor vehicle door, the head portion pivoted toward the vehicle in case of a collision, can finally also be readjusted conveniently through the window opening of the door.

While we have shown and described only one embodiment in accordance with the present invention, it is understood that the same is not limited thereto but is susceptible of numerous changes and modifications as known to a person skilled in the art. In particular, the present invention is also applicable to such outside mirrors which do not have the illustrated approximately rectangular shape as long as the essentially vertical pivot axis of the head portion extends on the side of the vehicle in relation to the vertical center axis of the head portion. Accordingly, we do not wish to be limited to the details shown and described herein.

We claim:

1. A safety outside mirror for motor vehicles which includes a unitary base portion with two ends adapted to be fixedly secured at one end to the side of a body and a head portion carrying a mirror glass having a vertical center axis and adapted to be adjusted relative to said base portion, characterized in that the head portion is frictionally and adjustably retained on the other end of the base portion about a substantially vertical pivot axis that is located in relation to the vertical center axis of the mirror on the side nearer the vehicle so that the distance from the outer edge of said mirror to said pivot axis is greater than the distance from the inner edge of said mirror to said pivot axis, and in that a threaded screw means forming said substantially vertical pivot axis of rotation if provided which connects the head portion with the base portion, said threaded screw means being substantially vertically arranged and having a screw head, said threaded screw means extending through an approximately spherically shaped bearing means provided on the head portion, and the head portion being frictionally supported with its bearing means against a complementary socket for the bearing means provided on the base portion by a coil spring means surrounding the threaded screw means and engaging under stress the screw head as well as the bearing means so that the head portion, in case of impact against its outer edge area, is able to deflect from its normal operating position without danger of damages to the motor vehicle due to the relatively long lever arm formed by the distance from the outer edge to said pivot axis, notwithstanding a frictional resistance between the bearing means and bearing socket that is larger than the aerodynamic forces, normally counteracting a rotary movement about said pivot axis, said threaded screw means together with said bearing means and said bearing socket constituting the sole means enabling adjustment of the head portion relative to the base portions.

2. An outside mirror with a mirror shell means forming part of the head portion and having a lower boundary edge according to claim 1, wherein said bearing means includes a substantially spherically shaped bearing body integral with said head portion and provided with an opening exceeding the screw diameter to permit adjustment of the head portion within said socket, and a bearing member provided with a partial substantially spherically shaped bearing surface complementary to the inner bearing surface of the bearing body, said bearing member being provided with a bore only slightly larger than the external diameter of the screw means and having a top surface against which is supported one end of the spring means, said top surface extending above the lower boundary edge of the mirror shell means whereby, in case of a collision, a tilting of the head portion in the driving direction toward the rear and in a downward direction is precluded.

3. An outside mirror according to claim 1, wherein said base portion is relative short and is directed upwardly at a relatively steep inclination.

4. An outside mirror with a mirror shell means forming part of the head portion and having a lower boundary edge according to claim 1, wherein a separating surface is formed between the head portion and the base portion which extends above the lower boundary edge of the mirror shell means.

5. An outside mirror mounted on the side door of a motor vehicle according to claim 1, wherein said pivot axis is disposed a substantial distance from the inner edge of said head portion to minimize the lateral protuberance of the outside mirror when mounted on a side door.

* * * * *